(12) United States Patent
Hu et al.

(10) Patent No.: US 10,209,017 B2
(45) Date of Patent: Feb. 19, 2019

(54) CRYOGENIC HEAT TRANSFER BY A NANOPOROUS SURFACE

(71) Applicant: University of Florida Research Foundation, Inc., Gainesville, FL (US)

(72) Inventors: Hong Hu, Gainesville, FL (US); Jacob N. Chung, Gainesville, FL (US); Kirk Jeremy Ziegler, Gainesville, FL (US); Cheng Xu, Gainesville, FL (US); Yang Zhao, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 15/327,477

(22) PCT Filed: Jul. 24, 2015

(86) PCT No.: PCT/US2015/042030
§ 371 (c)(1),
(2) Date: Jan. 19, 2017

(87) PCT Pub. No.: WO2016/014961
PCT Pub. Date: Jan. 28, 2016

(65) Prior Publication Data
US 2017/0184354 A1 Jun. 29, 2017

Related U.S. Application Data

(60) Provisional application No. 62/028,355, filed on Jul. 24, 2014.

(51) Int. Cl.
*F28F 13/18* (2006.01)
*B82Y 30/00* (2011.01)
*C01F 7/02* (2006.01)

(52) U.S. Cl.
CPC ............ *F28F 13/187* (2013.01); *B82Y 30/00* (2013.01); *C01F 7/02* (2013.01); *C01P 2006/16* (2013.01);
(Continued)

(58) Field of Classification Search
CPC .. F28F 13/187; F28F 2245/02; F28F 2245/04; F28F 2250/20; F17C 13/004;
(Continued)

(56) References Cited

U.S. PATENT DOCUMENTS 340,685 A 4/1886 Sprague
3,885,595 A * 5/1975 Gibson ................ F16L 59/188
138/155

(Continued)

FOREIGN PATENT DOCUMENTS

JP 2014098200 A 5/2014

OTHER PUBLICATIONS

International Search Report for PCT/2015/042030 dated Oct. 23, 2015.
(Continued)

*Primary Examiner* — Davis Hwu
(74) *Attorney, Agent, or Firm* — Thomas Horstemeyer, LLP

(57) ABSTRACT

Various methods and systems are provided for cryogenic heat transfer by nanoporous surfaces. In one embodiment, among others, a system includes a cryogenic fluid in a flow path of the system; and a system component in the flow path that includes a nanoporous surface layer in contact with the cryogenic fluid. In another embodiment, a method includes providing a cryogenic fluid; and initiating chilldown of a cryogenic system by directing the cryogenic fluid across a nanoporous surface layer disposed on a surface of a system component.

20 Claims, 8 Drawing Sheets

(52) U.S. Cl.
CPC ....... *F28F 2245/02* (2013.01); *F28F 2245/04* (2013.01); *F28F 2255/20* (2013.01); *F28F 2260/00* (2013.01); *Y10S 977/811* (2013.01)

(58) Field of Classification Search
CPC ......... F17C 2260/035; F17C 2260/021; B82Y 30/00; C01P 2006/16; Y01S 977/811; F16L 59/141
USPC .......................................................... 165/133
See application file for complete search history.

(56) References Cited

U.S. PATENT DOCUMENTS

| | | | |
|---|---|---|---|
| 5,381,666 A | | 1/1995 | Saho et al. |
| 6,487,866 B1* | | 12/2002 | Fesmire ................ G01N 25/18 374/44 |
| 2003/0136547 A1 | | 7/2003 | Gollan et al. |
| 2006/0218940 A1 | | 10/2006 | Starkovich |
| 2009/0077982 A1* | | 3/2009 | Brower ................ F16L 59/141 62/50.7 |
| 2010/0229662 A1 | | 9/2010 | Brower |
| 2014/0138861 A1 | | 5/2014 | Chen et al. |
| 2017/0101773 A1* | | 4/2017 | Doshi ....................... E04B 1/78 |

OTHER PUBLICATIONS

Li, et al., "Fabrication adn Microstructuring of Hexagonally Ordered Two-Dimensional Nanopore Arrays in Anodic Alumina", Advanced Materials, Communications, 1999, 11, No. 6, pp. 483-487.

Dabagh et al., "The Role of Micropores Structure in Conductive and Convective Heat Transfer within Porous Media," Journal of Porous Media (vol. 12, No. 4, pp. 301-311, 2009) (Abstract only).

Choi et al., "The Effect of Micro-Pore Configuration on the Flow and Thermal Fields of Supercritical CO2," Environmental Engineering Research (vol. 17, No. 2, pp. 83-88, 2012).

T. R. Ogden, "Thermal Conductivity of Hard Anodized Coatings on Aluminum," AIAA/SAE/ASME/ASEE 23rd Joint Propulsion Conference, pp. 1-4, Jun. 1987.

\* cited by examiner

CRYOGENIC HEAT TRANSFER BY A NANOPOROUS SURFACE

CROSS REFERENCE TO RELATED APPLICATIONS

This application is the 35 U.S.C. § 371 national stage application of PCT Application No. PCT/US2015/042030, filed Jul. 24, 2015, which claims priority to, and the benefit of, U.S. provisional application entitled "Cryogenic Heat Transfer by a Nanoporous Surface" having Ser. No. 62/028,355, filed Jul. 24, 2014, both of which are herein incorporated by reference in their entireties.

BACKGROUND

Cryogenic fluids are widely used in industrial applications, space exploration, and cryosurgery systems. Specifically, in space exploration, cryogenic fluids are used in the power and propulsion, thermal management, and life-support systems of a spacecraft during space missions. These systems involve transport, handling, and storage of these fluids under both terrestrial and microgravity conditions. For example, cryogens such as liquid hydrogen and oxygen are used as liquid fuels such as that liquid hydrogen and oxygen that are burned in the liquid-fueled rocket engine. When a cryogenic fluid transport system first starts up, its walls and hardware go through a transient chilldown period prior to reaching steady state operation. Chilldown is the process of adjusting the system to the low temperature scale, which is usually several hundred degrees below the room temperature. The chilldown or quenching process is a complicated phase-change phenomenon, involving unsteady two-phase flows, and heat and mass transfer.

SUMMARY

Embodiments of the present disclosure are related to cryogenic heat transfer by nanoporous surfaces. In one or more aspects, heat transfer to a cryogenic fluid is accomplished via a nanoporous surface layer of a component or device.

In an embodiment, a system is provided that comprises a cryogenic fluid in a flow path of the cryogenic system; and a system component in the flow path. The system component comprises a nanoporous surface layer disposed on a surface of the system component with the nanoporous surface layer in contact with the cryogenic fluid. The nanoporous surface layer can enhance chilldown of the system component during initiation of operation of the cryogenic system. Chilldown time of the system component can be decreased by about 20% with respect to an equivalent system component with a smooth inner surface instead of the nanoporous surface layer. The surface of the system component can comprise an aluminum substrate and the nanoporous surface layer can comprise anodized aluminum oxide disposed on the aluminum substrate. The cryogenic fluid can be liquid nitrogen (LN2), liquid hydrogen (LH2), liquid oxygen (O2), or liquid methane ($CH_4$).

In one or more aspects, the nanoporous surface layer can comprise an array of nanopores in a hexagonal pattern. A pore density of the array of nanopores can be in a range from about $10^{10}$ pores per $cm^2$ to about $10^{12}$ pores per $cm^2$. The nanoporous surface layer can comprise nanopores in a range from about 10 nm to about 100 nm in diameter or in a range from about 25 nm to about 65 nm in diameter. The system component can be a pipe or tube. The system component can be a tank. The system component can be an integrated circuit (IC) chip. The system can be a spacecraft propulsion, thermal management, or life-support system. The system can be a cryosurgery system. The nanoporous surface layer can be patterned to yield distinct hydrophobic and hydrophilic regions.

In an embodiment, a method is provided that comprises providing a cryogenic fluid; and initiating chilldown of a cryogenic system by directing the cryogenic fluid across a nanoporous surface layer disposed on a surface of a system component. The cryogenic fluid can be provided via a flow path of the cryogenic system. The surface of the system component comprises an aluminum substrate and the nanoporous surface layer comprises anodized aluminum oxide disposed on the aluminum substrate. The nanoporous surface layer can comprise an array of nanopores in a hexagonal pattern. A pore density of the array of nanopores can be in a range from about $10^{10}$ pores per $cm^2$ to about $10^{12}$ pores per $cm^2$. The nanoporous surface layer can comprise nanopores in a range from about 10 nm to about 100 nm in diameter or in a range from about 25 nm to about 65 nm in diameter.

In one or more aspects, the system component can be a pipe or tube, a tank, or an integrated circuit (IC) chip. The cryogenic system can be a space craft propulsion, thermal management, or life-support system, or a cryosurgery system. The cryogenic fluid can be liquid nitrogen (LN2), liquid hydrogen (LH2), liquid oxygen (O2), or liquid methane ($CH_4$).

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
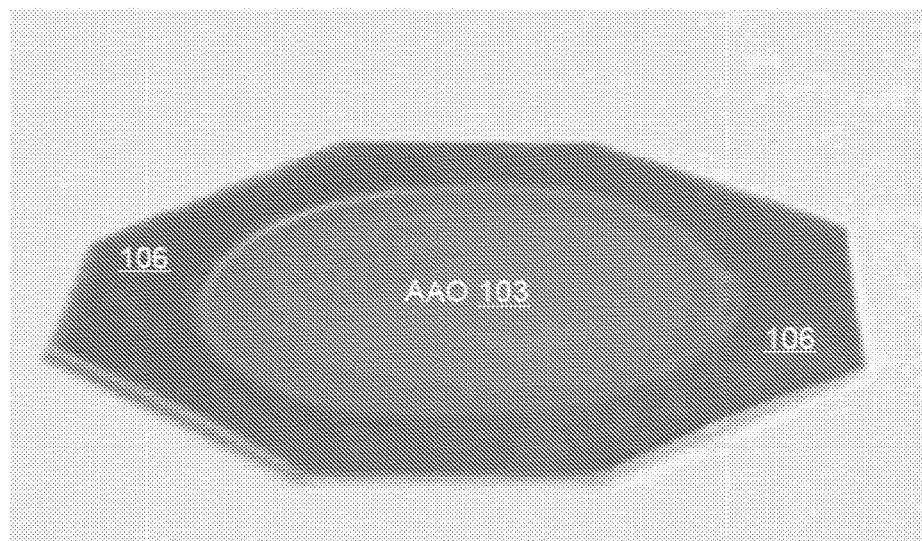
FIGS. 1A and 1B are images of an example of a nanoporous surface with a nanoporous surface of anodized aluminum oxide (AAO) in accordance with various embodiments of the present disclosure.

Disclosed herein are various embodiments of methods and systems related to cryogenic heat transfer by nanoporous surfaces. Reference will now be made in detail to the description of the embodiments as illustrated in the drawings, wherein like reference numbers indicate like parts throughout the several views.

All power production devices and advanced electronic systems depend on efficient thermal energy transport mechanisms to acquire heat input and to reject waste heat for the purpose of achieving higher power density and higher system efficiency. Among the three heat transfer modes, convective heat transfer, especially with a phase-change process such as boiling, quenching and condensation, has been traditionally relied on to provide the super high heat transfer rates. However, as engineers continue to push for advanced power devices, such as Generation IV nuclear reactor concepts, with more powerful functions and to conserve energy consumption, higher system operating temperatures and power densities will be considered. This can be seen in the electronic industry, where the lack of a breakthrough in computer microprocessor cooling has put a halt on the advancement of chip processing speeds. Phase-change thermal energy transport mechanisms offer a solution as the conventional convective heat transfer technologies have reached their limits.

The present disclosure discusses a heat transfer surface comprising a nanoporous surface layer. The nanoporous surface can comprise anodized aluminum oxide (AAO) on an aluminum substrate. The nanoporous texture creates a highly wettable superhydrophilic surface property. When compared to a traditional aluminum surface, the AAO nanoporous superhydrophilic heat transfer surface drastically alters the boiling and quenching characteristics, which include an increase of the Leidenfrost temperature, shortening of the film boiling regime, enhancement of the critical heat flux, and higher transition and nucleate boiling heat flux levels. This nanoporous heat transfer surface is capable of providing a substantial heat transfer enhancement in all three boiling and quenching regimes. In addition, physical morphology and pore distribution affect wettability as well as evaporation rates. Nanoporous alumina substrates can have different pore distributions (e.g., uniform, random, geometrically and linearly arranged) morphologies and pore sizes. Examples of various nanoporous surface properties are listed in TABLE 1. The roughness factor is defined as the ratio of the true area of the solid surface to its projected area. The wettability can influence the critical heat flux (CHF), nucleate boiling heat transfer, and the Leidenfrost temperature.

TABLE 1

| Properties | Range |
| --- | --- |
| Depth | 100-$10^6$ nm |
| Diameter | 10-300 nm |
| Pore Density | $10^{10}$-$10^{12}$ per $cm^2$ |

TABLE 1-continued

| Properties | Range |
| --- | --- |
| Roughness Factor | 16-4.5 × $10^8$ |
| Thermal Conductivity | 0.5-1.0 W/mK |

Figure 1B:
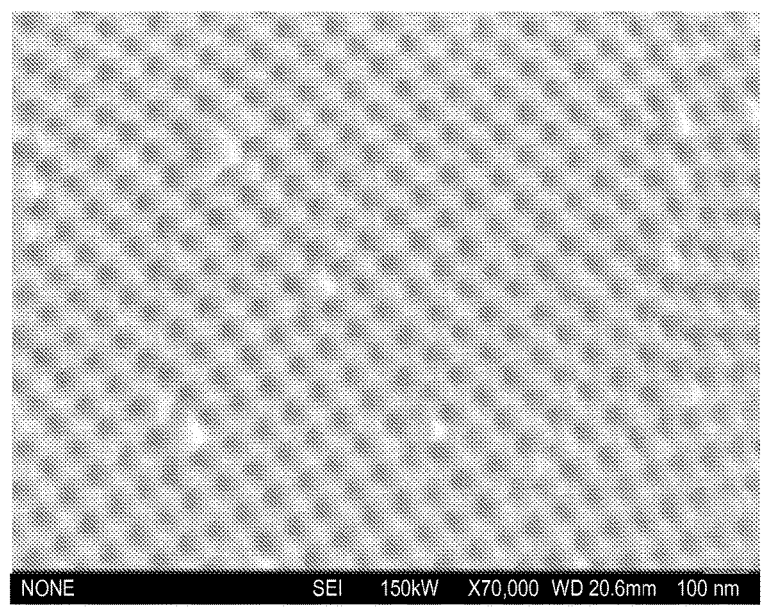

Referring to FIG. 1A, shown is an example of a nanoporous surface with an nanoporous surface of anodized aluminum oxide (AAO) 103 on an aluminum substrate 106. Patterned growth of one dimensional nanostructures on surfaces can be accomplished using anodic aluminum oxide (AAO) templates, which can allow better control over the length, diameter, and spacing over other deposition processes. Because of the tight distribution in pore size and self-ordered hexagonal pattern, as shown in the example of FIG. 1B, AAO provides an excellent architecture for the fabrication of nanoporous surfaces to control heat transfer at the interface. The scanning electron microscope (SEM) image of FIG. 1B shows a porous anodic aluminum oxide (AAO) on aluminum with 50 nm pores in a hexagonal arrangement. The average diameter of the nanopores can be in a range of about 10 nm to about 300 nm, about 10 nm to about 200 nm, about 10 nm to about 100 nm, about 20 nm to about 70 nm, about 25 nm to about 65 nm, or about 30 nm to about 50 nm. In some implementations, the average diameter of the nanopores may be ±20-30% of the average diameter. Porous nanostructures, such as porous anodic aluminum oxide (AAO) and ordered mesoporous silica, can be fabricated for heat flux measurements and visualization of the boiling process. Biphilic surfaces that have well-defined hydrophobic and hydrophilic regions may also be fabricated to help prevent bubble interactions and coalescence that limits heat transfer.

With the heat transfer surface made of aluminum and AAO, a wide operating temperature range is possible. The anodization process used to construct the nanoporous surface layer is facile and can be applied to a broad range of surfaces (e.g., curved or irregular shapes), which enables the heat transfer surface to be adapted to many applications. The dimensions of the nanoporous surface can be controlled by the anodization voltage, electrolyte solution, and anodization time, providing a process with high precision in controlling the surface properties. With the nanoporous heat transfer surface constructed of aluminum oxide, the surface should exhibit similar properties to the bulk material, which include good strength and stiffness, good hardness and wear resistance, good corrosion resistance, and good thermal stability. The nanoporous surfaces will be durable with long-term reliability in many applications.

The use of the nanoporous surface for heat transfer applications in cryogenic systems will be discussed. Cryogenic fluids are used for aerospace propulsion, compressed liquid fuel storage (e.g., liquefied $CH_4$, $H_2$), and medical devices. The key aspects affecting these processes are the refueling time, control of the $H_2$ flow rate, the energetic penalty of $H_2$ liquefaction, and the loss of $H_2$ from boil-off (safety relief). Any system that uses cryogenic fluids must go through a transient chilldown period to reach steady-state operation. The excessive flow and pressure fluctuations created during chilldown and operation can create extreme stress on the system that can lead to mechanical failure. The boil-off of the cryogenic fluid and subsequent pressure rise present potential safety hazards that may require venting, reduction in the operating range, and/or loss of the cryogenic fluid. Nanoporous heat transfer interfaces can reduce boil-off and venting, providing safer systems. Microgravity environments can impose additional unique requirements on the morphology of the surface since momentum and heat transfer is hindered by the absence of gravity. Design of pore size and surface tension can enable optimization of heat transfer and reduction of the energy requirements of liquefaction. Control over the nanopore dimensions (size and depth) may modify the boiling nucleation, growth and detachment characteristics and, thus, enhance the heat transfer.

Figure 2:
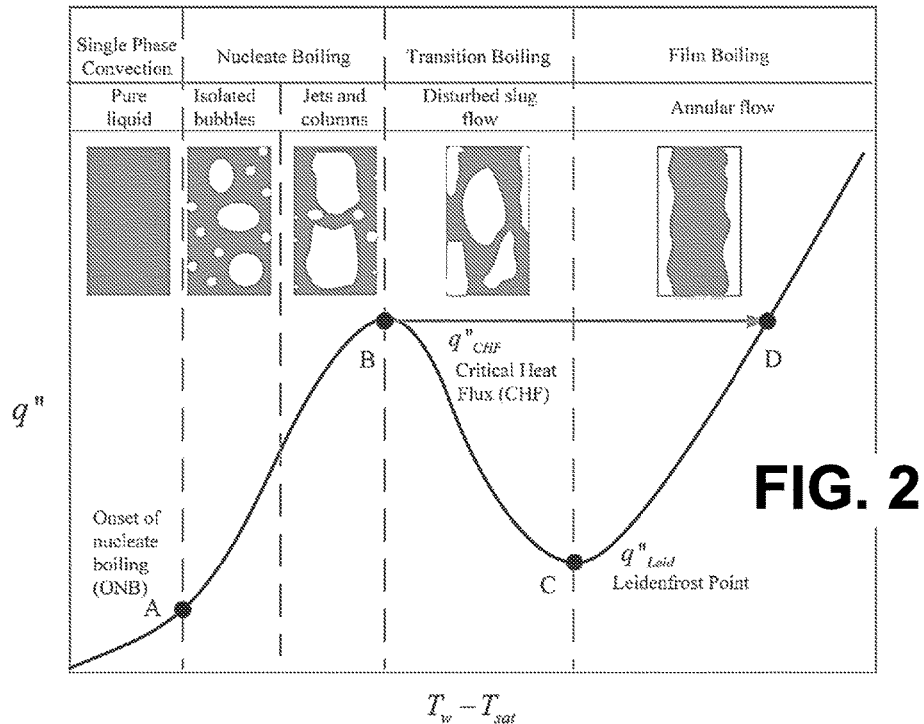
FIG. 2 is a graphical representation of an example of a typical boiling curve including different boiling regime and corresponding flow pattern in accordance with various embodiments of the present disclosure.

Referring to FIG. 2, shown is an example of a typical boiling curve where the heater surface heat flux, q", is plotted against the heater surface degree of superheating, $T_W - T_{sat}$ where $T_W$ is the surface temperature and $T_{sat}$ is the saturation temperature corresponding to the system pressure. Boiling and chilldown (quenching) are characterized by the tube wall surface temperature and wall heat flux according to the boiling curve. Since the wall temperature is strictly determined based on the energy balance of the wall by tracking all the in and out heat fluxes, accordingly the heat flows in and out of the tube wall are the important parameters for the wall temperature tracking. In boiling, the heat source is externally supplied and thus can be controlled independently, such as the constant wall heat flux condition. In that case, boiling is a heat flux (independent variable) controlled process. For the heat flux controlled condition, the boiling follows the route of A→B→D. In order to avoid a huge temperature jump, boiling usually runs safely below B in nucleate boiling.

In chilldown, since the wall does not have any external source of heat (except a small amount of residual heating), the heat coming out of the wall can only be supplied internally from the thermal capacity (stored energy) of the wall. The only way to get the heat to come out is by changing (lowering) the inner wall surface temperature due to cooling from the cryogenic flow. Accordingly, the wall inner surface temperature is the independent variable and the control parameter. In summary, quenching is a conjugate heat transfer process-wall-fluid interaction. The quantity of heat (heat flux) that is released to the fluid can only be associated with the temperature change of the wall inner surface. As a result, the wall surface temperature is the controlling parameter that forces the quenching process to follow the route D→C→B→A.

In boiling applications such as those in the cooling of a nuclear reactor, super high heat flux heat transfer in the nuclear boiling regime is the standard practice. The only precaution is not to exceed the critical heat flux (CHF) and enter the film boiling regime. However, film boiling is the first mode of boiling encountered in chilldown and cannot be avoided. Due to its low heat fluxes at high wall temperatures, the chilldown efficiency in general is extremely low as a result. For example, the average chilldown efficiency can be about 8%. For many applications that utilize the cryogen as the working fluid, improvement in the quenching efficiency offers may advantages.

Heat and mass transfer during line chilldown is an important consideration for spacecraft design. Chilldown of cryogenic liquid transfer lines have been studied under normal gravity condition for liquid nitrogen (LN2) and liquid hydrogen (LH2). To investigate the heat transfer characteristics and flow pattern during the quenching under both terrestrial conditions and microgravity conditions, LN2 can be used as the working fluid. In some cases, unique flow patterns can exist under microgravity conditions.

An experiment was designed and performed to evaluate the modification and enhancement on the quenching heat transfer by a nanoporous heat transfer surface. For comparison purposes, two sample surfaces were used: a mechanically polished traditional aluminum surface serving as the base case, and an aluminum substrate with the anodized aluminum oxide (AAO) nanoporous surface layer. The quenching experiment was conducted by submerging the room temperature test rod into a liquid nitrogen pool. The results indicate that the nanoporous surface completely modified and enhanced the phase-change heat transfer in all three quenching regimes. Compared to the traditional surface case, the Leidenfrost temperature was increased by 32K and the critical heat flux (CHF) was raised by 156% by the nanoporous surface. The most significant modification on the boiling mechanisms by the nanoporous surface was found in the transition regime that is composed of transitional film and transitional nucleate sub-regimes with quite different quenching curve slopes. For cryogenic quenching applications, the nanoporous surface may save 29% in the amount of cryogen consumption by shortening the chilldown time. The modification and enhancement are mainly attributed to the superhydrophilic property and nanoscale nucleation sites offered by the nanoporous surface.

Figure 3A:
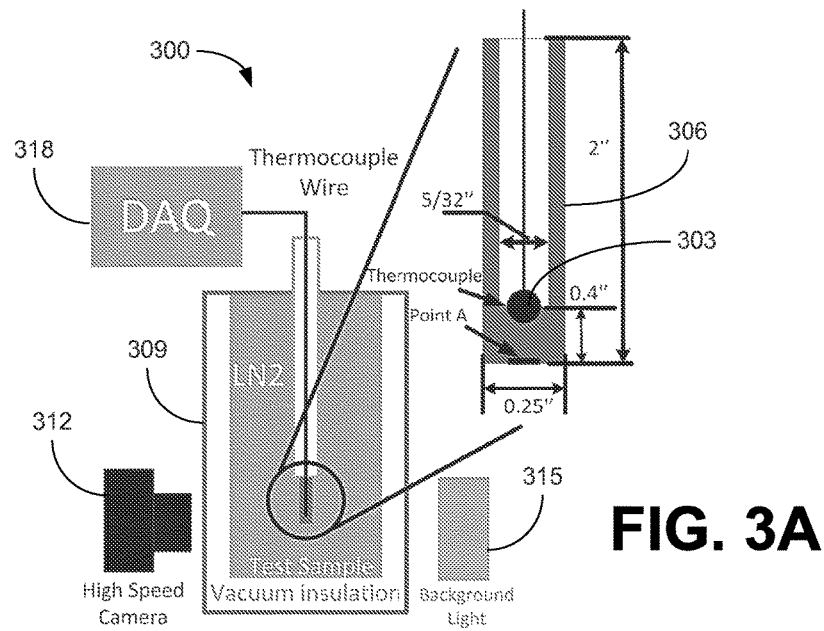
FIGS. 3A and 3B are schematic diagrams of an example of an experimental apparatus comprising a nanoporous surface of FIGS. 1A and 1B in accordance with various embodiments of the present disclosure.
Figure 3B:
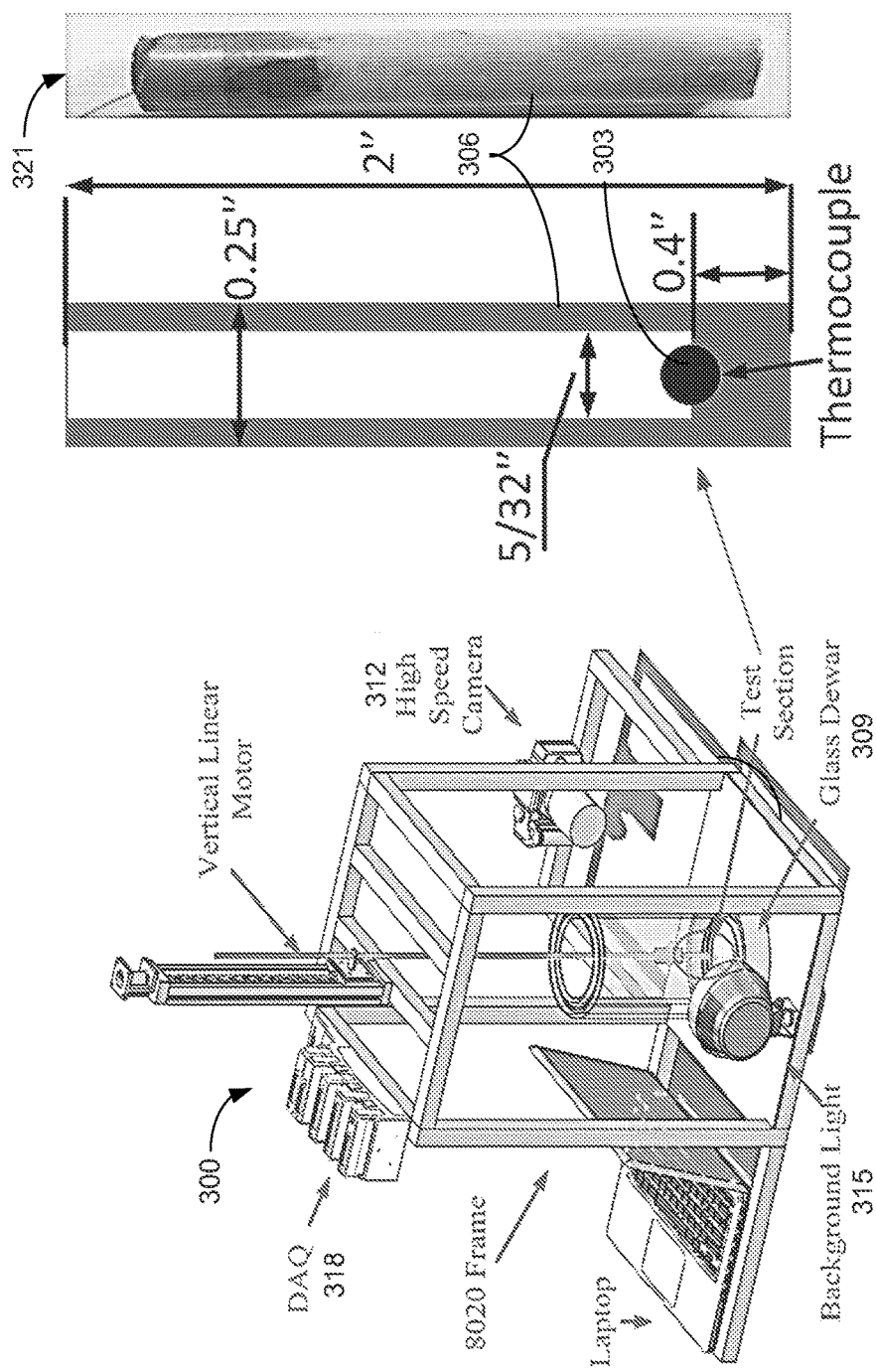

The experiment was designed to build a simple system that can explore all the fundamental physics and mechanisms of phase-change heat transfer while eliminating all unnecessary complicating factors. Instead of an internal convective flow chilldown system, a pool quenching experiment was used as the basic characteristics of the quenching curve (reversed boiling curve) are not fundamentally affected by the bulk flows. FIGS. 3A and 3B illustrate schematic diagrams of the experimental apparatus 300. A single thermocouple 303 was buried into the center bottom of the test rod 306. The distance between the bottom of the test rod 306 and thermocouple 303 was manufactured to be as small as possible to reduce the thermal inertia of the rod 306.

A transparent glass dewar 309 with vacuum insulation for thermal isolation from the surroundings was used to form a liquid nitrogen pool that was maintained at atmospheric pressure using an opening to outside the dewar 309. The test section was an aluminum test rod 306 (99.99% purity) with a thermocouple bead 303 embedded along the centerline of the rod 306 and 0.4 inch from the bottom surface. A fast response and high sensitivity T-type 40 AWG (0.0799 mm diameter) micro thermocouple 303 was used to record temperature history at a 14 Hz data acquisition frequency.

A set of background lights 312 and a high speed camera 315 were setup to collect video data on the two-phase bubble dynamics. The video was utilized to analyze the behavior of the interaction between vapor and liquid. The recording speed of the camera 315 was set at 2000 frames per second. To study the nanopore surface effects, two different test rods were used: a mechanically polished traditional surface serving as the base case, and a surface with the anodized aluminum oxide (AAO) nanoporous finish. The experiment started when the test rod 303 was submerged in the dewar 309. In order to demonstrate the repeatability and reduce the aleatory uncertainty, 15 sets of nanoporous surface tests and traditional surface tests were conducted.

The test rod with anodized aluminum oxide (AAO) surface was fabricated by a two-step anodization process. A pure aluminum rod was cleaned by sonication in soapy de-ionized water, acetone, and ethanol respectively. Then the aluminum rod was put into an electropolish solution (e.g., Electro Polish System Inc.) at 65° C. with a constant voltage of 17 V for 20 min. After that, the first anodization was carried out at 15° C. and a constant voltage of 40 V in 0.3 M oxalic acid solution with stirring for 16 hours. After stripping off the anodized AAO layer in a mixture of 10 wt % phosphoric acid and 1.8 wt % chromic acid, the pattern of perfectly arranged ordered nanopores was formed on the aluminum rod surface. The second anodization was done in the same condition of the first anodization. Its time was varied to control the final AAO thickness with a rate of 5 μm per hour. At the end of the second anodization, the voltage was reduced at a rate of 0.5 V per 30 s to thin the barrier layer.

Figure 4A:
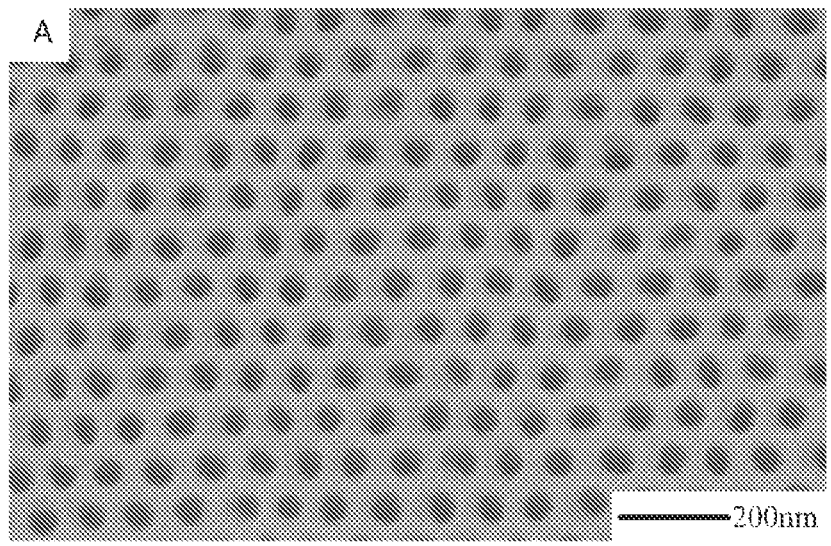
FIGS. 4A and 4B are scanning electron microscope (SEM) images of an anodic aluminum oxide (AAO) layer comprising an array of nanopores in accordance with various embodiments of the present disclosure.
Figure 4B:
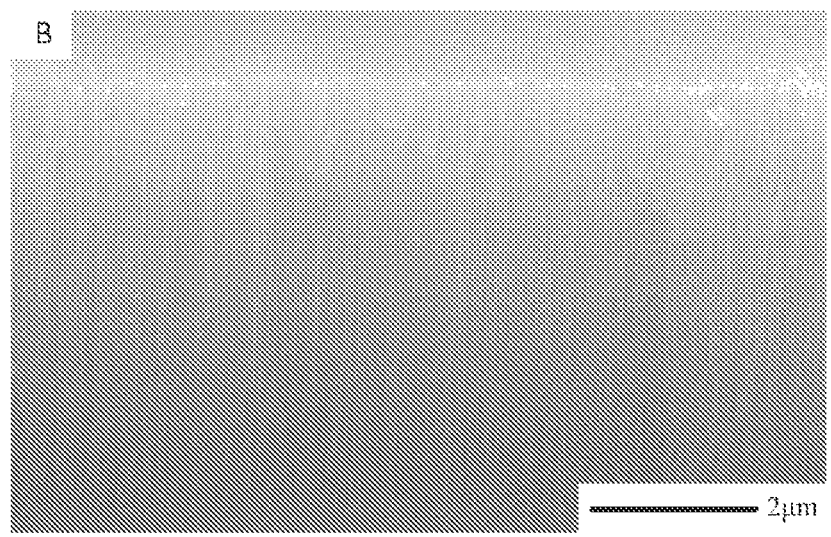

The pore opening process was in the 5 wt % phosphoric acid at room temperature monitored by the electrochemical setup (e.g., VersaStat 3, Princeton Applied Research), for which a small voltage of 0.1 V was applied against a carbon counter electrode. The current was controlled carefully so that the pore opening process stopped as the current increases remarkably which indicates that the pores were fully opened. FIGS. 4A and 4B show SEM images of an example of the finished surface. The regular hexagon pattern of pores can be seen in top view of FIG. 4A. The density of the nanopores can be in a range from about $10^{10}$ to about $10^{12}$ pores per $cm^2$. The center-to-center distance between the nanopores can be in a range from about 20 nm to about 600 nm, about 20 nm to about 400 nm, about 20 nm to about 200 nm, about 30 nm to about 150 nm, or about 50 nm to about 100 nm. For example, the distribution of the nanopores can be about twice the diameter of the nanopores. The depth of the pores is about 4.5-5 μm in the cross-sectional view of FIG. 4B. However, the length of the pores can be varied between 100 nm and 1 mm.

Figure 5A:
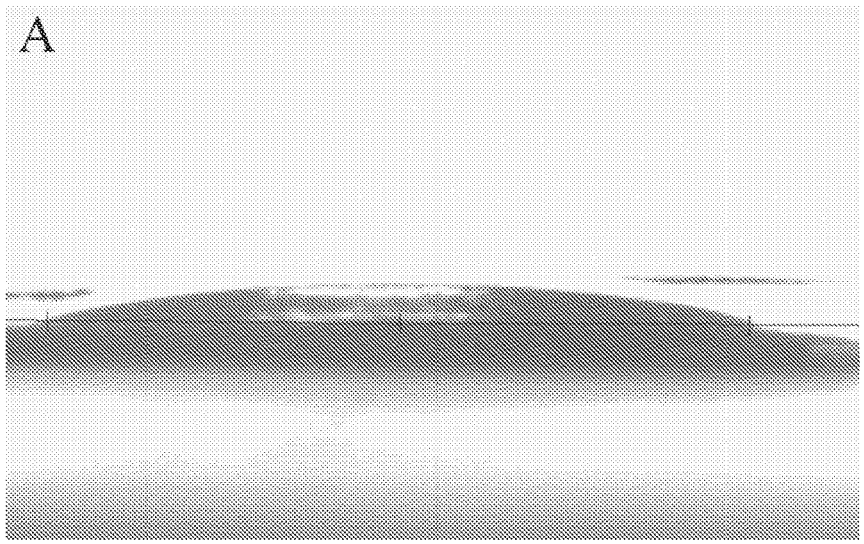
FIGS. 5A and 5B are images illustrating the contact angle of water on a nanoporous surface and a traditional surface, respectively, in accordance with various embodiments of the present disclosure.
Figure 5B:
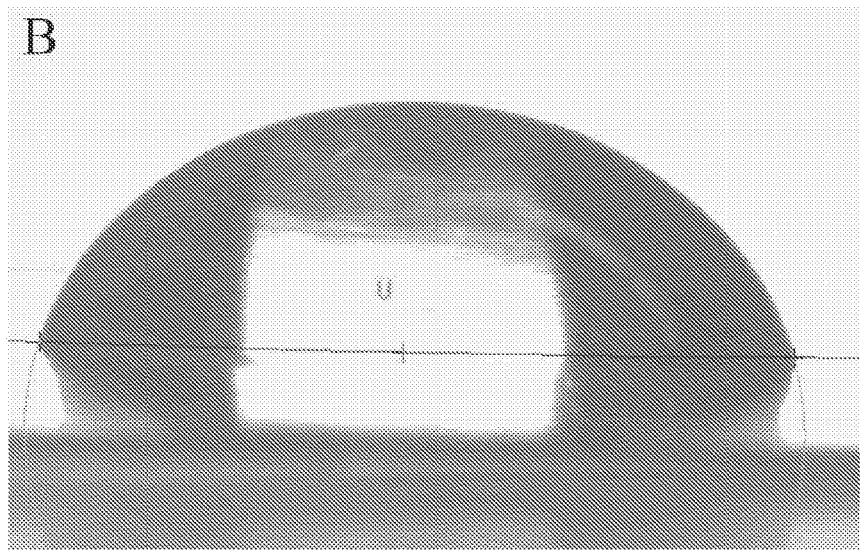

The contact angles of the samples were measured for the nanoporous surface as well as the traditional surface with a 1 μL drop of deionized water at room temperature using a Kruss DSA100 Drop Shape Analyzer. Contact angles were measured for 3 drops at 3 different places on the sample. Each example was measured 3 times. FIGS. 5A and 5B provide images of the contact angle drop tests of the nanoporous surface and traditional surface, respectively. The contact angle measured on the nanoporous surface of FIG. 4A was found to be 13.1±1.7°. The contact angle measured on the traditional surface of FIG. 4A was found to be 74.6±1.6°. Therefore, the nanoporous surface was shown to exhibit superhydrophilic properties.

FIG. 3B includes an image 321 of a test rod 306 of the test setup shown in FIGS. 3A and 3B. The dimensions of the test rod 306 were determined by a caliper. The mass of the test rod 306 was measured through an electronic scale. The thermocouples 303 (FIGS. 3A and 3B) had the uncertainty of ±1.5% full scale, as suggested by the manufacturer. Another uncertainty source for the temperature measurement comes from the DAQ 318 (FIGS. 3A and 3B) whose uncertainty was ±0.1% full scale. In the current experiment, inverse heat conduction methods were used to obtain the surface heat fluxes from the measured temperatures. The uncertainty of the heat flux was calculated through a square root summation of partial derivatives. Both the uncertainties from the experimental apparatus and from the parameters are listed in TABLE 2.

TABLE 2

| Source of uncertainty | Symbol | Uncertainty |
|---|---|---|
| Rod inside diameter | $d_i$ (mm) | ±0.001 mm |
| Rod mass | $M_r$ (g) | ±0.0001 g |
| Outside temperature | $T_o$ (K) | ±1.6% |
| Inner temperature | $T_i$ (K) | ±1.6% |
| Heat flux | $q_i$ (K) | ±6.8% |

For a liquid-to-vapor phase-change heat transfer study, the so-called "boiling curve" which is the heat flux plotted as a function of the degree of superheating, $T_W - T_{sat}$, of the heater surface (see FIG. 2) is often of great interest because it denotes the regimes of the different heat transfer mechanisms and is utilized for engineering applications. However, as mentioned above, during the chilldown or quenching process, the rod bottom surface temperature (labeled "point A" in FIG. 3A) is the independent variable. Therefore, the heat flux at point A cannot be controlled independently. Additionally, the temperature measurement for point A on the test rod 306 is difficult to perform directly. Therefore, the surface heat flux can only be inferred from the temperature history recorded by the embedded thermocouple 303. The heat flux and the surface temperature at point A were obtained by solving the inverse heat conduction problem (IHCP). The test section is approximated as one-dimensional circular slab. The effect of radiation on the outer surface is neglected. An analytical method was derived to obtain the rod bottom surface temperature and heat flux at point A of the exposed surface based on the temperature of a thermocouple 303 positioned inside the rod 306 of the test section by the following equation.

$$T_o = T_i + \frac{1}{2!} \frac{x^2}{\alpha_r} \frac{dT_i}{dt} + \frac{1}{4!} \left(\frac{x^2}{\alpha_r}\right)^2 \frac{d^2 T_i}{dt^2} + \frac{1}{6!} \left(\frac{x^2}{\alpha_r}\right)^3 \frac{d^3 T_i}{dt^3} + \dots , \quad (1)$$

where the subscript o denotes the outside surface ("point A" in FIG. 3A) of the rod 306 and i indicates the location of the thermocouple 303 inside the rod 306. The x is the distance between the thermocouple 303 and point A of the bottom surface, t is the measurement time, and $\alpha_r$ is the thermal conductivity of the rod. The heat flux at point A can be approximated by the first three leading terms of an infinite series given by:

$$q_o'' = -\rho_r C_{p,r} x \left[ \frac{dT_i}{dt} + \frac{1}{3!} \frac{x^2}{\alpha_r} \frac{d^2 T_i}{dt^2} + \frac{1}{5!} \left(\frac{x^2}{\alpha_r}\right)^2 \frac{d^3 T_i}{dt^3} \right], \quad (2)$$

where $C_{p,r}$ is the specific heat of the rod and $\rho_r$ is the density of the aluminum rod.

Figures 6A, 6B:
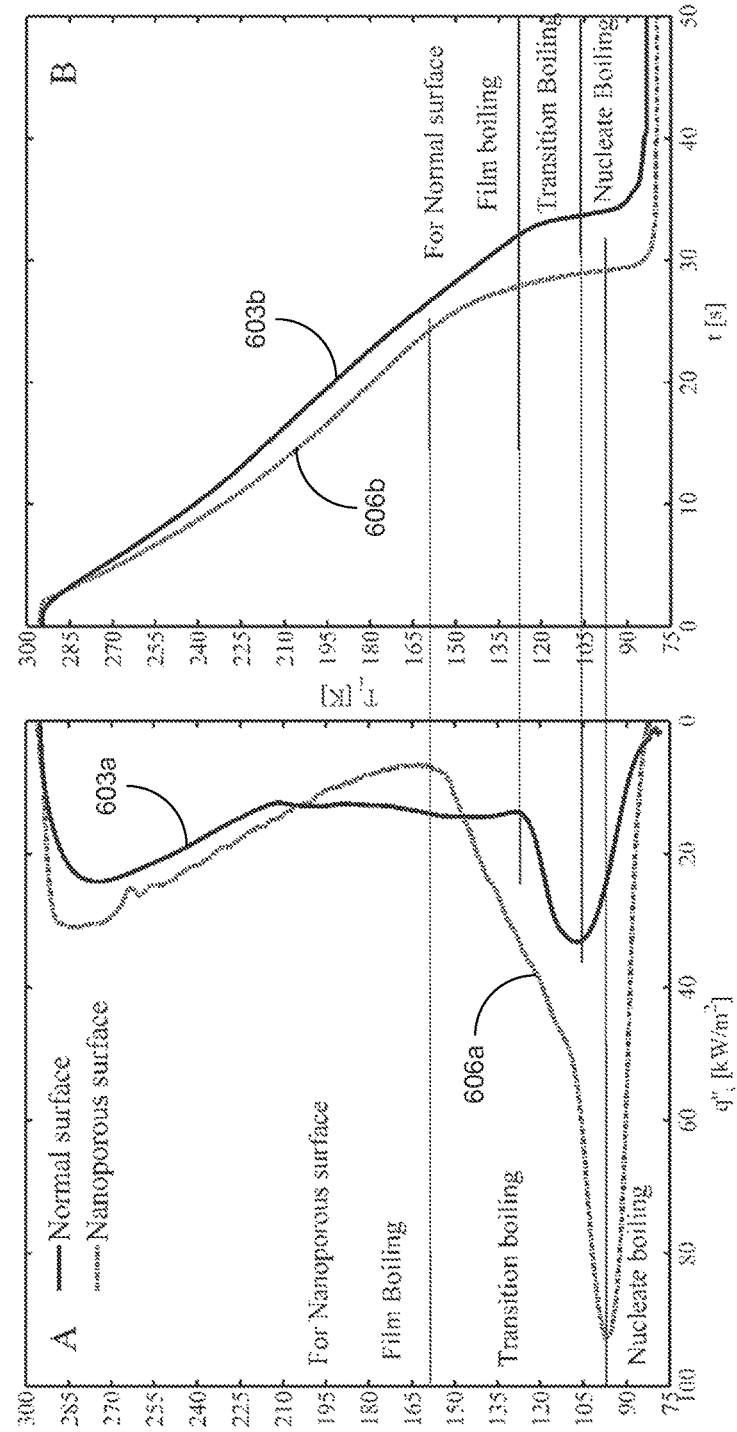
FIGS. 6A and 6B are examples of quenching curves and chilldown curves, respectively, for nanoporous and traditional surfaces in accordance with various embodiments of the present disclosure.

The quenching (chilldown) process takes place when the rod 306 is quenching in the pool from the room temperature (about 300K) down to the liquid nitrogen pool temperature at 77.35K that is the saturated temperature under the atmospheric condition. Based on the measured data by the thermocouple 303, the time dependent surface temperatures and heat fluxes at "point A" (FIG. 3A) of the bottom surface of the test rod 306 during chilldown were estimated using the thermocouple 303 measured temperature and EQNS. (1) and (2) as outlined above. With the temperature and heat flux histories obtained, the chilldown heat transfer characteristics can be generated accordingly. For the purposes of illustrating the differences of chilldown heat transfer between a mechanically finished traditional surface and a nanoporous surface, respective quenching curves 603a and 606a are shown in FIG. 6A and chilldown curves 603b and 606b are shown in 6B. It is noted that the two plots share the same vertical axis that indicates the temperature of the rod surface at point A.

As seen in FIG. 6B, the total chilldown time is shorter for the nanoporous surface case. Specifically the time for the surface to reach 80K is 31 seconds for the nanoporous surface and 37 seconds for the traditional surface that is about 20% slower. This substantial saving in the chilldown time was mainly achieved by the nanoporous surface in the film boiling regime. The traditional surface spent 32 seconds in the film boiling regime, while it only took 24 seconds for the nanoporous surface.

On the quenching heat transfer mechanisms as shown in FIG. 6A, the nanoporous surface facilitated a higher Leidenfrost temperature (about 156K) that resulted in a quicker switch from the film boiling regime to the transition boiling regime as compared to the traditional surface whose Leidenfrost temperature was found at 126K that took 8 seconds longer to reach. Other than the Leidenfrost point, the nanoporous surface produced a substantially modified transition boiling process as compared to the traditional surface that presents an ordinary transition boiling pattern. The transition boiling on the nanoporous surface is considered to be composed of two different heat transfer mechanisms that resulted in the two apparently different slopes. Mainly due to the modified transition regime, both the heat flux at the CHF point and those in the nucleate boiling regime were substantially increased.

Figure 7:
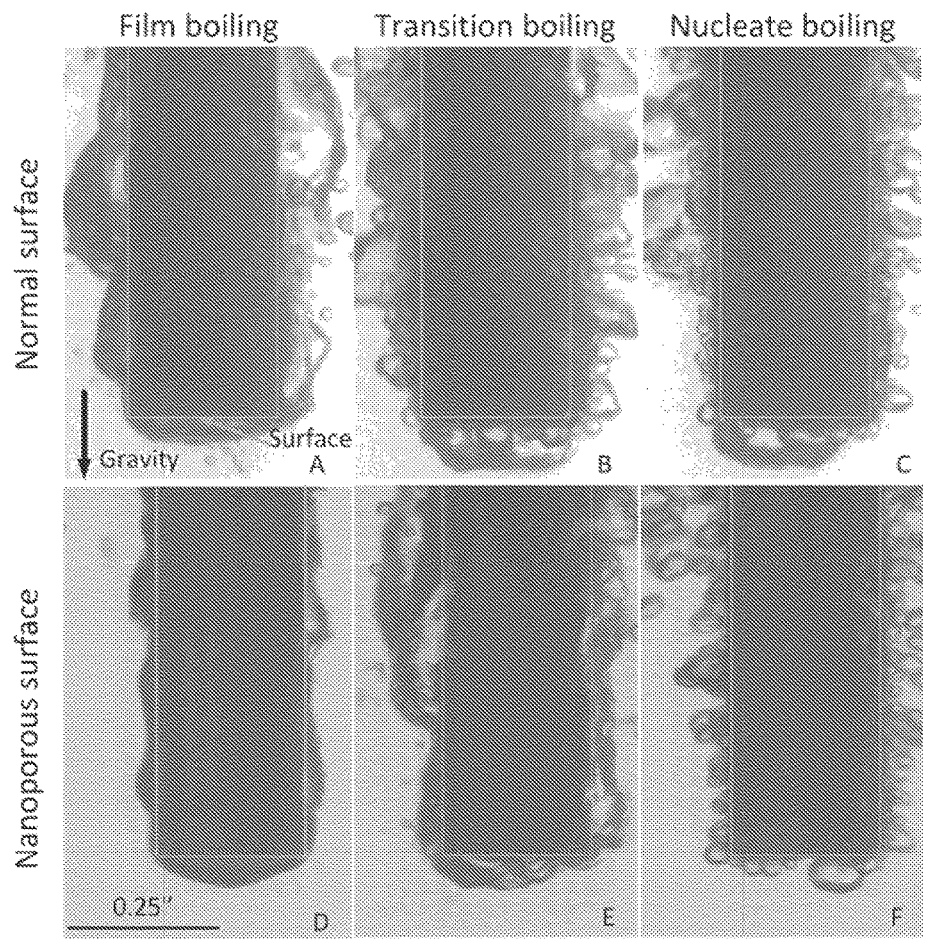
FIG. 7 includes images of solid-fluid interactions and liquid-vapor hydrodynamics on the traditional and nanoporous rod surfaces of FIG. 3A and eB during the chilldown process in accordance with various embodiments of the present disclosure.

Referring to FIG. 7, shown are images of the solid-fluid interactions on the traditional and nanoporous rod surfaces, and also the liquid-vapor hydrodynamics that show the flow pattern evolution during the chilldown process. FIGS. 7(A), 7(B), and 7(C) illustrate the film boiling region, transition boiling region, and nucleate boiling region for the traditional surface, respectively. FIGS. 7(D), 7(E), and 7(F) illustrate the film boiling region, transition boiling region, and nucleate boiling region for the nonporous surface, respectively.

Focusing on the film boiling regime, a comparison of the images of FIG. 7(A) with FIG. 7(D), it can be seen that the vapor films on the traditional surface are thicker and contain more dynamic interactions than those of the nanoporous surface. The thinner films explain the higher heat fluxes associated with the nanoporous surface. Also the nanoporous surface produced smoother liquid-vapor interfaces. The following 'micro-damper' theory may explain this. Millions of nano sized porous cavities work as millions of micro dampers that facilitate the attenuation of the high frequency perturbations. As a result, the perturbations would not be amplified on the rod 306, while for the traditional surface, the surface roughness would magnify and amplify the perturbations to form turbulent flows and interactions.

In the transition boiling regime, as shown between FIGS. 7(B) and 7(E), the traditional surface still generally produced thicker and more chaotic two-phase patterns as in the film boiling case. But, the liquid-vapor layers are generally thicker than those produced during film boiling. This may be due to more vapor being generated as the liquid starts to be able to contact the surface, which results in high rates of nucleation and bubble generation.

In the nucleate boiling regime, with respect to the two-phase flow on the nanoporous surface as shown in FIG. 7F, a large amount of small and separated bubbles are generated in an explosive manner. However, as shown in FIG. 7C, the traditional surface results in a different pattern where bubbles tend to merge together to form larger vapor slugs that point outwards from the surface. This phenomenon causes a longer attachment time during which the bubbles stay on the surface, which may be the main reason why the traditional surface has a lower heat flux in the nucleate boiling regime. The nanopores on the nanoporous surface function to make the surface superhydrophilic and also create more nucleation sites that enhance nucleation and bubble escape from the surface.

Figure 8:
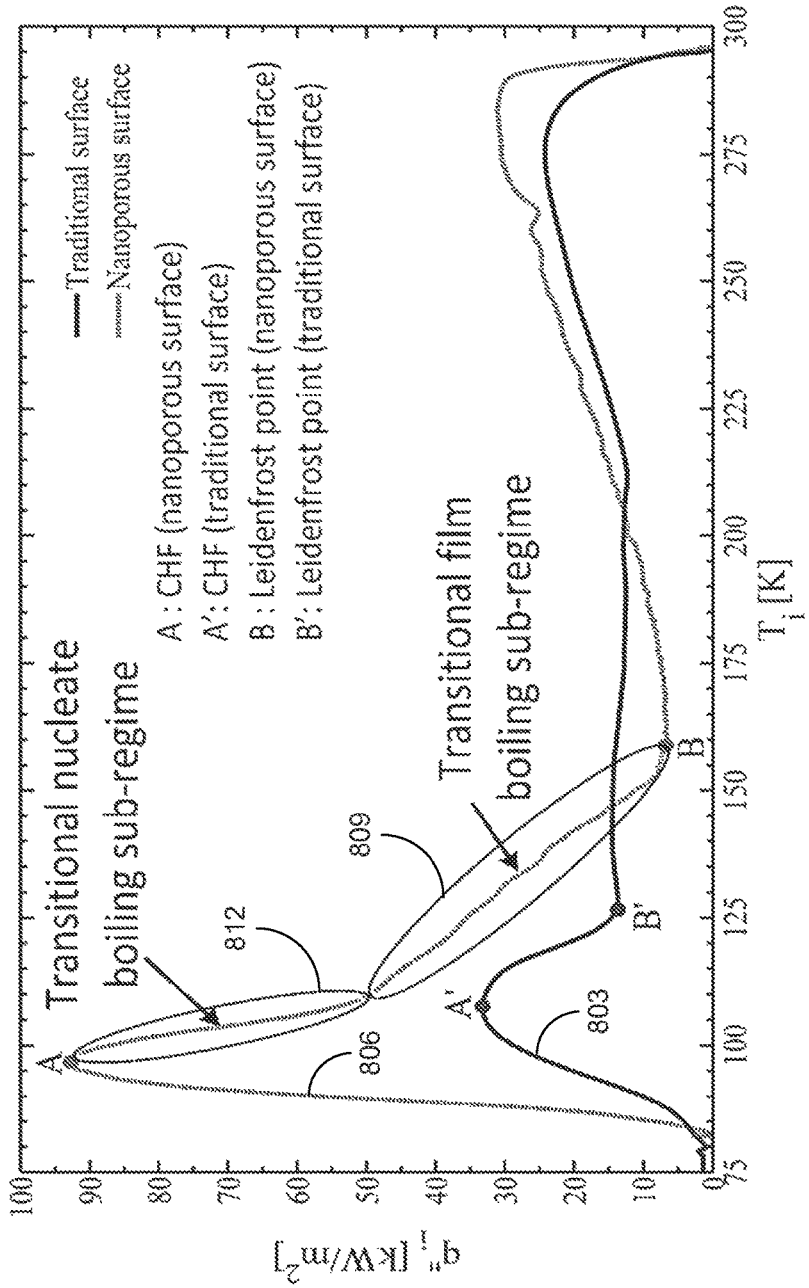
FIG. 8 is an example of quenching curves for nanoporous and traditional surfaces in accordance with various embodiments of the present disclosure.

Referring next to FIG. 8, the two quenching curves 803 and 806 (reversed boiling curves) obtained from the traditionally finished surface and the nanoporous surface, respectively, are plotted together for a close comparison. As the two cases share all the same experimental conditions (quenching fluid and its thermodynamic conditions, test rod geometry, orientation and position in the pool, and test rod material), except that the test rod 306 (FIGS. 3A and 3B) is fabricated with a nanoporous surface case, the comparison emphasizes the effects produced by the nanoporous surface structures. The differences between the two quenching curves can be attributed directly to the nanoporous structures on the test rod surface. The surface properties such as the surface nanoscale cavity characteristics and wettability could modify the nucleation and vaporization mechanisms that can enhance the heat transfer rates and accordingly the quenching curve characteristics.

As shown in FIG. 8, in the film boiling regime, the nanoporous surface shows a higher heat flux when the surface temperature is higher than 200K. After that, the heat flux from the nanoporous surface became lower all the way to the minimum heat flux point (Leidenfrost point). But, for the average heat transfer in the film boiling regime, the nanoporous surface is higher as the nanoporous surface was chilled down faster in the film boiling regime than the traditional surface. Another significant difference is that the nanoporous alumina surface has produced a relatively large increase in the Leidenfrost temperature from 126±6K observed on the traditional surface to 158±2.6K on the nanoporous surface, a 32K difference. This is a 25% increase, which shortened the film boiling regime substantially. This change in the Leidenfrost temperature may be attributed to the increase in the wettability by the superhydrophilic nanoporous surface.

Compared to the Leidenfrost point of the traditional surface, the higher Leidenfrost temperature of the nanoporous surface may be called a "jump" from the Leidenfrost temperature on the traditional. The Leidenfrost point on the traditional surface may be attributed to the phenomenon that hydro-dynamically the surface is not hot enough to generate enough vapor to keep the film from collapsing. However the reason for the "jump" on the nanoporous surface may be attributed to the enhanced wettability, so the liquid is able to contact the surface at a higher temperature that terminates the film boiling.

The most significant impact on the boiling mechanisms by the nanoporous surface was found in the transition regime. Examining the quenching curve of the nanoporous surface for the transition regime in FIG. 8, it can be seen that the curve 806 is composed of two sub-regimes with different slopes that intersect or transition at a surface temperature of about 110K. The lower heat flux sub-regime 809 is called the transitional film boiling and the higher heat flux sub-regime 812 is called the transitional nucleate boiling. Basically, the transitional film boiling is an extension of the film boiling where the film boiling mechanism is still dominant but some liquid-solid contact can start to take place. Even the slightest liquid contact can lead to substantial nucleation and vapor generation due to the relatively higher surface temperatures. As the temperature of the surface decreases, a larger surface portion can support the liquid contact and vapor generation that leads to the rise of heat flux. As the wall surface continues to cool down, at some point the surface area that allows liquid contact overwhelms the dry area. The heat transfer process has then moved into the transitional nucleate boiling sub-regime 812. As the wall surface temperature continues to drop, the additional nucleation and vapor generation supports the rise in the heat flux to the point where the vapor escape path is not able to vent all the vapor being generated, which is the point of the CHF.

Compared to the traditional surface case (curve 803), the nanoporous surface produced a much higher heat flux in the transition boiling regime. This may be mainly attributed to the enhanced wettability and more nucleation cavity sites offered by the nanoporous surface. The enhanced wettability raised the Leidenfrost temperature, which gives rise to relatively higher temperatures (more thermal energy potential) in the transition regime. The higher temperatures combined with the additional nucleation capability promote the higher heat fluxes in the transition boiling regime.

Regarding to another important parameter, the CHF measured on nanoporous surface is 105±7.8 kW/m$^2$, which shows a nearly 160% increase over the 40±3.1 kW/m$^2$ measured on the traditional surface. Since the CHF is the end point of the transition nucleate boiling sub-regime, the enhancement mechanism facilitated by the nanoporous surface given discussed also applies to the CHF point. In the nucleate boiling regime, the surface is completely wettable and the heat transfer is solely by nucleation and bubble generation. As discussed above, the nanoporous surface is superhydrophilic and possesses extra nanoscale nucleation cavities that both strongly enhance the nucleation and bubble generation rates for supporting a much higher heat flux than the traditional surface.

As discussed, a test rod 306 (FIGS. 3A and 3B) was used to evaluate the modification and enhancement by a nanoporous surface on the quenching heat transfer. In the systems used in actual cryogenic chilldown applications, the quenching process takes place inside a tube, pipe, or other component in the cryogenic fluid flow path. As seen in FIG. 6B, the chilldown time is shorter for the nanoporous surface case. Specifically, the time for the surface to reach 80K is 31 seconds for the nanoporous surface, as compared to 37 seconds for the traditional surface, which is about 20% slower. Assuming that the same mass flow rates are used to chill two pipes with identical dimensions, wall thickness and material, but one has a traditional inner surface and the other has a nanoporous inner surface, it is possible for the pipe with the nanoporous inner surface to save about 20% in cryogen consumption.

The chilldown performance between a traditional aluminum surface and a nanoporous surface has been experimentally compared. The nanoporous surface was shown to exhibit superior phase-change heat transfer performance when compared to the traditional surface in all three boiling regimes. The anodized aluminum oxide (AAO) finished nanoporous surface can successfully survive the cryogenic temperature environment and can be used in cryogenic applications such as those used in space exploration. A nanoporous surface can improve the CHF by about 160% and increase the Leidenfrost temperature by about 28K over a traditional surface. The chilldown time can thus be decreased by about 20%. The nanoporous surface can produce significant effects by increasing the Leidenfrost temperate and heat flux levels in the transition regime.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A cryogenic system, comprising:
   a cryogenic fluid in a flow path of the cryogenic system; and
   a system component in the flow path, the system component comprising a nanoporous surface layer having a first side disposed on a surface of the system component and a second side opposite the first side, the second side of the nanoporous surface layer in contact with the cryogenic fluid flowing through the flow path.

2. The cryogenic system of claim 1, wherein the nanoporous surface layer enhances chilldown of the system component during initiation of operation of the cryogenic system.

3. The cryogenic system of claim 2, wherein chilldown time of the system component is decreased by about 20% with respect to an equivalent system component with a smooth inner surface instead of the nanoporous surface layer.

4. The cryogenic system of claim 1, wherein the surface of the system component comprises an aluminum substrate and the nanoporous surface layer comprises anodized aluminum oxide disposed on the aluminum substrate.

5. The cryogenic system of claim 1, wherein the cryogenic fluid is liquid nitrogen (LN2), liquid hydrogen (LH2), liquid oxygen (O2), or liquid methane ($CH_4$).

6. The cryogenic system of claim 1, wherein the second side of the nanoporous surface layer comprises an array of nanopores in a hexagonal pattern.

7. The cryogenic system of claim 6, wherein a pore density of the array of nanopores is in a range from about $10^{10}$ pores per cm$^2$ to about $10^{12}$ pores per cm$^2$.

8. The cryogenic system of claim 1, wherein the second side of the nanoporous surface layer comprises nanopores in a range from about 10 nm to about 100 nm in diameter.

9. The cryogenic system of claim 8, wherein the second side of the nanoporous surface layer comprises nanopores in a range from about 25 nm to about 65 nm in diameter.

10. The cryogenic system of claim 1, wherein the system component is a pipe or tube.

11. The cryogenic system of claim 1, wherein the system component is a tank.

12. The cryogenic system of claim 1, wherein the system component is an integrated circuit (IC) chip.

13. The cryogenic system of claim 1, wherein the cryogenic system is a spacecraft propulsion, thermal management, or life-support system.

14. The cryogenic system of claim 1, wherein the cryogenic system is a cryosurgery system.

15. The cryogenic system of claim 1, wherein the nanoporous surface layer is patterned to yield distinct hydrophobic and hydrophilic regions on the second surface.

16. A method, comprising:
providing a cryogenic fluid; and
initiating chilldown of a system component of a cryogenic system, the system component comprising a nanoporous surface layer having a first side disposed on a surface of the system component and a second side opposite the first side, the chilldown initiated by directing the cryogenic fluid across and in contact with the second side of the nanoporous surface layer.

17. The method of claim 16, wherein the cryogenic fluid is provided via a flow path of the cryogenic system, wherein the system component is in the flow path.

18. The method of claim 16, wherein the surface of the system component comprises an aluminum substrate and the nanoporous surface layer comprises anodized aluminum oxide disposed on the aluminum substrate.

19. The method of claim 16, wherein the system component is a pipe or tube.

20. The method of claim 16, wherein the cryogenic fluid is liquid nitrogen (LN2), liquid hydrogen (LH2), liquid oxygen (O2), or liquid methane ($CH_4$).

* * * * *